United States Patent [19]
Bautista et al.

[11] Patent Number: 5,962,067
[45] Date of Patent: Oct. 5, 1999

[54] METHOD FOR COATING AN ARTICLE WITH A LADDER SILOXANE POLYMER AND COATED ARTICLE

[75] Inventors: Jerry Rodolfo Bautista, Atlanta, Ga.; Edwin Arthur Chandross, Murray Hill; Valerie Jeanne Kuck, Upper Montclair, both of N.J.

[73] Assignee: Lucent Technologies Inc., Murray Hill, N.J.

[21] Appl. No.: 08/926,210

[22] Filed: Sep. 9, 1997

[51] Int. Cl.$^6$ ....................................................... B05D 5/06
[52] U.S. Cl. .......................... 427/163.2; 524/361; 528/19; 528/23; 428/391; 427/434.7; 106/287.12; 106/287.13; 106/287.16
[58] Field of Search ............................... 524/361; 528/19, 528/23; 428/391; 427/163.2, 434.7; 106/287.12, 287.13, 287.16

[56] References Cited

U.S. PATENT DOCUMENTS

| | | | |
|---|---|---|---|
| 3,450,672 | 6/1969 | Merrill et al. | 528/12 |
| 5,052,779 | 10/1991 | Honjo et al. | 385/145 |
| 5,198,518 | 3/1993 | Yamamoto et al. | 528/12 |
| 5,859,162 | 1/1999 | Yamatoto et al. | 528/31 |

FOREIGN PATENT DOCUMENTS

| | | |
|---|---|---|
| 0725103A2 | 3/1996 | European Pat. Off. . |
| 63-056569 | 3/1988 | Japan . |
| 05125187 | 5/1993 | Japan . |
| 06200030 | 10/1994 | Japan . |

*Primary Examiner*—Melvyn I. Marquis
*Assistant Examiner*—Mark W. Milstead
*Attorney, Agent, or Firm*—Scott J. Rittman

[57] ABSTRACT

The invention provides a method for coating an article with a siloxane-based coating composition that results in a coating with high thermal mechanical stability, the method also allowing commercially acceptable speeds to be employed while inhibiting beading of the coating prior to cure. In one embodiment, an article is coated with a composition containing a first methylsilsequioxane oligomer having an initial viscosity of about 2000 cp or less, a second methylsilsequioxane oligomer having an initial viscosity of about 40,000 to about 90,000 cp, a viscosity-lowering additive of a lower aliphatic ketone, and a catalyst. In another embodiment, the invention provides a method for coating an article with a modified methylsilsequioxane coating suitable for higher temperature applications than an all-methyl coating. This embodiment involves coating an article with a composition comprising an oligomer characterized by A:B:C, where A represents the number of methyl pendant groups in the oligomer and is about 13 to about 67, B represents dimethyl pendant groups and is about 0 to about 33, and C represents phenyl pendant groups and is about 10 to about 80, a lower aliphatic ketone viscosity-lowering additive, and a catalyst of a moderately strong protic acid. In a third embodiment, it is possible to attain an even higher temperature coating. The method involves a step of applying a coating containing modified methylsilsequioxane oligomer that was prepared by mixing methyltriethoxysilane monomer with dimethyldiethoxysilane monomer that has already been partially hydrolyzed and oligomerized.

45 Claims, No Drawings

METHOD FOR COATING AN ARTICLE WITH A LADDER SILOXANE POLYMER AND COATED ARTICLE

BACKGROUND OF THE INVENTION

1. Field of the Invention

The invention relates to coatings, in particular, coatings comprising siloxanes.

2. Discussion of the Related Art

Glass optical fibers drawn from a heated glass preform or glass melt exhibit good strength as long as the surface of the drawn fiber remains defect-free. Thus, protective coatings, typically formed from thermoplastics or liquid-applied curable polymer-based resins, are normally applied to fibers immediately after they are drawn and prior to contact between the fiber and any other surface. Typically, the fiber is passed through a fluid polymer that is diluted in monomer or in a solvent to effect the coating, e.g., by use of a draw cup, such as that disclosed in U.S. Pat. No. 4,264,649. Optical fibers used in applications where temperatures are high, e.g., exceeding 175° C., for extended periods of time require a coating that is mechanically stable at such temperatures, i.e., a coating with high thermal mechanical stability. Conventional ultraviolet-cured acrylate coatings can be safely used only at temperatures below about 100° C. For higher temperatures, solvent-based polyimide coatings are often used. However, due to low polymer solubility, only thin coatings, e.g., much less than 10 $\mu$m, can be applied at each pass of the fiber through a coating composition. Since a protective coating about 10 to about 50 $\mu$m thick is generally desirable, several passes, e.g., several successive draw cups, are required to obtain a polyimide coating of adequate thickness. Moreover, the draw speed for solution-based polyimide coatings is limited to about 0.1 m/sec to allow for removal of solvent and completion of the imidization reaction, if required, before the coated fiber is able to be wound on a spool. Such limitations are not compatible with commercial requirements because slow draw speeds and a need for numerous passes through a draw cup complicate the process, reduce productivity, and increase expense.

Materials having siloxane backbones, e.g., crosslinkable primarily poly(dimethyl silicones), have been used for coating optical fibers for higher temperature applications. Silicone coatings, however, are rubbery, do not adhere well to glass fiber, and have poor mechanical strength. Organosilsequioxanes, which are precursors of siloxane ladder polymers (dual siloxane chains having cross-links that resemble the rungs of a ladder), have also been used for higher temperature coatings. See, for example, U.S. Pat. No. 5,052,779 to Honjo et al. and U.S. Pat. No. 4,835,057 to Bagley et al. Organosilsequioxanes are made by carefully controlled hydrolysis and condensation of organotrialkoxysilanes, typically triethoxysilanes. The resulting silanol groups condense with other silanol groups or with residual silyl ethoxy groups to form a siloxane bond, with the elimination of either water or alcohol. The condensation is typically accelerated by heat, e.g. temperatures of about 100 to about 150° C., and by the addition of an acid or a base.

As reflected in the Honjo et al. patent, siloxane ladder materials are normally applied to a fiber as a solution of a solid silsequioxane polymer (known in the art as flake), having a molecular weight of about 5,000 to about 10,000, in a solvent, and thermally cured after solvent evaporation. Use of a solvent with the silsequioxane is also discussed in the Bagley et al. patent. Methoxy or ethoxy substituted silanes are normally used as precursors to the silsequioxanes, with the former being more reactive. Pendant groups on the siloxane backbone are often methyl or phenyl. Silsequioxanes form tougher and more adherent coatings than silicones, and generally have desirable thermal mechanical stability. However, the silsequioxane coatings described above require slow draw speeds, e.g., less than 0.5 m/sec, to obtain an acceptable, bubble-free, non-tacky coating. In the Bagley et al. patent, for example, the draw speed was 20 m/minute (about 0.3 m/sec) to obtain a relatively thin, 12 $\mu$m coating. As stated above, such draw speeds are too slow for commercial applicability. Typically, for specialty, high temperature optical fiber, draw speeds of about 1 m/sec or higher are considered to be acceptable.

Thus, siloxane-based coatings which exhibit high thermal stability, i.e., mechanical stability at high temperatures, and which are capable of being applied at acceptable draw speeds, are desired.

SUMMARY OF THE INVENTION

The invention provides a method for coating an article with a siloxane-based coating composition, the resultant coating exhibiting desirable thermal mechanical stability. (Thermal mechanical stability indicates the temperature at which a material maintains its mechanical integrity after exposure for an extended time, e.g., greater than one month, and shows no development of cracks when viewed through a light microscope with a magnification ranging from about 150× to about 400×.) The method also allows more commercially acceptable coating speeds to be employed, while inhibiting beading of the coating prior to cure.

In one embodiment, an article is coated with a composition containing a first methylsilsequioxane oligomer having an initial viscosity of about 2000 cp or less, a second methylsilsequioxane oligomer having an initial viscosity of about 40,000 to about 90,000 cp, a viscosity-lowering additive of a lower aliphatic ketone, and a catalyst. It was realized that, surprisingly, the presence of a small amount of the lower aliphatic ketone, e.g., about 1 to about 6 weight percent based on the total weight of the siloxane oligomer, had a unique viscosity-lowering effect on silsequioxane compositions that included, for example, a substantial amount (e.g., over 50 weight percent based on the total weight of the siloxane oligomer) of the higher viscosity, liquid methylsilsequioxane. (Oligomer, for purposes of the invention, indicates a partially reacted material that is flowable as a liquid. The term initial viscosity means the viscosity of the oligomer prior to inclusion in the mixture, and in the absence of any solvent or dispersant. Viscosity values used herein reflect viscosity at a temperature of about 25° C. Lower aliphatic ketone is defined as a ketone that contains no more than 5 carbon atoms, and for purposes of the invention also includes cyclopentane.)

The invention provides desirable results in that the use of the higher-viscosity methylsilsequioxane oligomer increases the composition's resistance to beading induced by surface tension, and the presence of the lower-viscosity methylsilsequioxane oligomer and the viscosity-lowering additive allows for good coating speeds. The method is particularly useful for coating optical fibers. Optical fibers were coated with a 20–30 $\mu$m thick methylsilsequioxane coating after a single draw at a speed of over 3 m/sec, a thickness and speed acceptable for commercial applications for high temperature resistant fiber.

In another embodiment, the invention provides a method for coating an article with a modified methylsilsequioxane composition suitable for higher temperature applications than a coating formed from only methylsilsequioxane (referred to herein as all-methyl). (The term modified indicates the presence of dimethyl and/or phenyl pendant groups). According to this second embodiment, an article is coated with a composition containing a modified methylsilsequioxane oligomer, a lower aliphatic ketone viscosity-lowering additive, and a catalyst of a moderately strong protic acid (stronger than a non-perfluorinated carboxylic acid, but weaker than a sulfonic acid). The modified oligomer is characterized by the pendant group ratio A:B:C, where A represents the percentage of pendant groups that are methyl and is about 13 to about 67, B represents the percentage of pendant groups that are dimethyl and is about 0 to about 33, and C represents the percentage of pendant groups that are phenyl and is about 10 to about 80. (A+B+C=100.) (A pendant group is a moiety containing a silicon atom with one or two carbon-based groups attached, e.g., methyl, dimethyl, phenyl.) Curing rates depend heavily upon the particular pendant group ratio of the modified methylsilsequioxane and on the particular coating composition.

The presence of dimethyl and phenyl pendant groups provides a molecular structure that has better crack-resistance than all-methyl silsequioxane, and the viscosity-lowering additive and moderately strong protic acid catalyst provide useful coating rates. Using the process of this embodiment, it is possible to achieve an approximately 20–30 μm thick optical fiber coating exhibiting a thermal mechanical stability of up to about 175 ° C., from a single draw at a speed of up to about 2 m/sec. This draw speed is typically acceptable for the resultant high temperature fiber.

In a third embodiment, it is possible to attain an even higher temperature coating. The method involves a step of applying a coating containing modified methylsilsequioxane oligomer that is prepared by mixing methyltriethoxysilane monomer, before hydrolysis and condensation, with dimethyldiethoxysilane monomer that has already been partially hydrolyzed and condensed. Optionally, phenyltriethoxysilane monomer is added to the partially hydrolyzed dimethyldiethoxysilane, and it is possible for the phenyltriethoxysilane to be partially hydrolyzed.

This third embodiment reduces the possibility of forming large blocks of methylsiloxy groups in the condensation polymer. Such reduction is desirable because extensive cross-linking of methylsiloxy groups leads to a stiff molecular structure with relatively poor thermal mechanical stability, evidenced by a tendency of the coating to develop cracks. In the molecular structure formed from the process of this embodiment, the cross-linking of methylsiloxy groups is reduced, and the dimethylsiloxy groups act as plasticizer segments between the cross-links. Phenyl pendant groups increase shock resistance, thermal stability, and also contribute to the overall flexibility of the structure by reducing the cross-link network density. This flexible molecular structure is able to withstand relatively high temperatures, e.g., a coating formed from an oligomer having a 20:60:20 pendant group ratio was able to withstand about a month at temperatures over 200° C. without cracking. In addition, draw speeds up to about 1 m/sec are capable of producing an approximately 20 μm thick coating on an optical fiber. Again, this draw speed will typically be commercially acceptable for the resultant high temperature optical fiber.

DETAILED DESCRIPTION OF THE INVENTION

In one embodiment, the invention provides a method for coating an article with a methylsilsequioxane oligomer. The method involves the steps of disposing a coating composition on an article, and curing the coating. The coating composition contains a mixture of a first methylsilsequioxane oligomer having an initial viscosity of about 2000 or less, a second methylsilsequioxane oligomer having an initial viscosity of about 40,000 to about 90,000 cp, a viscosity-lowering additive of a lower aliphatic ketone, and a catalyst. The viscosity of the overall coating composition is advantageously about 2,000 to about 20,000 cp. This viscosity is useful in obtaining a coating that is capable of being applied at an acceptably fast rate and yet resists beading.

Advantageously, the article is an optical fiber. Metal articles of various shapes are also capable of being coated according to the invention.

The first, lower viscosity methylsilsequioxane oligomer is typically a solventless liquid. It is advantageously present in the coating composition in an amount ranging from about 10 to about 20 weight percent based on the weight of the total siloxane oligomer in the coating composition. The second, higher viscosity methylsilsequioxane oligomer is also typically a solventless liquid. The second methylsilsequioxane oligomer is advantageously present in the coating composition in an amount ranging from about 80 to about 90 weight percent based on the total weight of the siloxane oligomer in the coating composition.

The lower aliphatic ketone viscosity-lowering additive is a volatile component that lowers the viscosity of the oligomers, in particular the second, higher viscosity, oligomer. (Volatile indicates that the material that is easily removed from a thin polymer coating during an early stage of a thermal cure.) The additive is typically present in an amount ranging from about 1 to about 6 weight percent based on the weight of the total siloxane oligomer. Advantageously, the additive is acetone.

The catalyst acts to accelerate the condensation of the methylsilsequioxane oligomer into the ladder siloxane structure. The catalyst is advantageously present in an amount ranging from about 0.5 to about 6 weight percent based on the weight of the total siloxane oligomer. Advantageously, the catalyst is zinc octoate. It is possible for metal soaps to be used to accelerate the condensation reactions. Examples of suitable metals include copper, cobalt, nickel, molybdenum, chromium, zinc, manganese, and vanadium. Useful catalysts generally represent a balance between shelf life and cure rate (which are normally inversely proportional). Catalysts used for latent cure of epoxies, e.g., Lewis acid-amine complexes, do not appear to offer acceptable properties in the invention.

In preparing the coating composition, localized oligomer condensation is possible upon addition of a catalyst. To decrease the probability of such localized condensation, it is useful to dilute the oligomers and the catalyst with a solvent before mixing. Advantageously, the solvent is a lower aliphatic ketone that is able to function as the viscosity-lowering additive when the solvent remains at relatively low concentration after removal of the bulk solvent. One method of preparation is to (a) dilute the first oligomer to about twice its volume in a solvent, (b) separately dilute the second oligomer in the solvent (b) separately dilute the catalyst to about 20 times its volume in the solvent, and (c) mix the first oligomer solution, second oligomer solution, and catalyst solution. The solvent is then removed. If the solvent is to be used as the viscosity-lowering additive, the desired amount is advantageously left in the composition. Other processes for preparing the composition are also possible.

The coating composition is applied to the article by any suitable method. Where the article is an optical fiber, the composition is advantageously applied by using a conventional draw cup, as discussed above. The coating is cured by any suitable method, generally by heat, the term cure indicating formation of an insoluble tack-free material with mechanical integrity. The methylsilsequioxane coating composition cures to a clear, adherent, ladder siloxane coating.

Using the process of this embodiment, it is possible to dispense a methylsilsequioxane coating composition on an optical fiber using a draw cup, at a speed of over 1 m/sec, advantageously over 3 m/sec, and obtain a post-cure coating thickness of at least about 20 μm after a single draw. The thermal mechanical stability limit of the all-methyl silsequioxane coating is below 150° C., as reflected in Example 1 below. A draw speed of about 3 m/sec is acceptable as a compromise between the desirable temperature resistance of the fiber and the cost of a process involving such a draw speed.

A second embodiment of the invention involves application of a coating that contains a modified methylsilsequioxane oligomer containing pendant dimethyl and pendant phenyl groups. In particular, the article is coated with a composition containing a mixture of the modified methylsilsequioxane oligomer, the lower aliphatic ketone viscosity-lowering additive discussed above, and a catalyst of a moderately strong protic acid, as defined above. Inclusion of phenyl pendant groups tends to enhance oxidative stability and reduce cross-link network density, and inclusion of dimethyl pendant groups also tends to increase flexibility by reducing cross-link network density and further reduce thermal shock sensitivity. Typically, these oligomers are prepared by mixing the desired amounts of methyltriethoxysilane, dimethyldiethoxysilane, and phenyltriethoxysilane with the necessary amount of water, and driving the condensation. It is also possible to use substituted phenyls. An example of a structure of a 33:33:33 ladder silsequioxane is shown below (Φ represents a phenyl group). Other pendant group distributions are also possible.

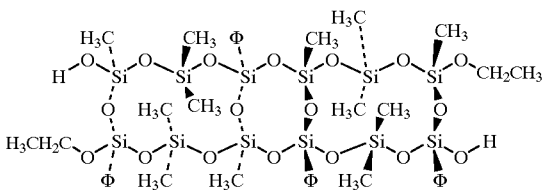

The structure contains a randomly-spaced distribution of cross-links separated by dimethylsiloxy groups, with phenyl groups offering further reduced network density without introducing excessive softness. The presence of phenyl and/or dimethyl pendant groups tends to slow the cure rate (i.e., the rate of condensation) of the coating (as reflected in the examples below), and therefore affects the choice of catalysts.

This embodiment uses an oligomer that is characterized by an A:B:C pendant group ratio, where A represents the percentage of pendant groups that are single methyl and is typically about 13 to about 67, B represents the percentage of pendant groups that are dimethyl and is typically about 0 to about 67, and C represents the percentage of pendant groups that are phenyl and is typically about 10 to about 80. (A+B+C=100 (or 99, for an equal distribution of pendant groups).) The desired ratio is obtained by inclusion of the appropriate amounts of methyltriethoxysilane monomer, dimethyldiethoxysilane monomer, and phenyltriethoxysilane monomer. The oligomer is typically a liquid having a viscosity of about 100 to about 4000 cp, and is advantageously present in the coating composition in an amount ranging from about 88 to about 98 weight percent based on the weight of the composition. The viscosity-lowering additive is typically present in an amount ranging from about 1 to about 6 weight percent based on the weight of the siloxane oligomer. Advantageously, the additive is acetone.

The moderately strong protic acid catalyst is advantageously present in an amount ranging from about 0.5 to about 6 weight percent based on the weight of the siloxane oligomer. Advantageously, the acid is PPA (phenylphosphonic acid). The moderately strong protic acid is useful in obtaining an acceptable cure rate when phenyl pendant groups are present and represents an acceptable balance between shelf life and cure rate.

As in the first embodiment, to decrease the probability of localized oligomer condensation during addition of a catalyst, it is useful to dilute the oligomer and the catalyst with a solvent before mixing. Advantageously, the solvent used with the oligomer is the viscosity-lowering additive, and the desired amount of the additive is left in the composition subsequent to mixing.

The coating composition is applied to the article and cured as discussed above. Using the process of this embodiment, it is possible to dispense and cure a coating composition on an optical fiber using a draw cup at a speed of over 1 m/sec, advantageously over 2 m/sec, and obtain a post-cure coating thickness of at least about 20 μm after a single draw. The thermal mechanical stability of a coating using a 33:33:33 oligomer is about 175° C.

In a third embodiment of the invention, the method involves application of a coating that, with certain ratios of pendant groups, is capable of withstanding temperatures of over 200° C. for over one month without cracking. The known, commercial method of forming a silsequioxane oligomer containing methyl, dimethyl, and phenyl pendant groups is to mix methyltriethoxysilane, dimethyldiethoxysilane, and phenyltriethoxysilane monomers, and the required amount of water, and then heat the reactants to drive the condensation. It was not previously known that this commercial method favors the partial hydrolysis of the most reactive monomer, methyltriethoxysilane, followed by condensation of the hydrolyzed species with itself and/or methyltriethoxysilane. The known method thus results in blocks of material with extensive cross-linking between methylsiloxy groups, creating a relatively stiff molecular structure that exhibits poor thermal mechanical stability. It was realized that when the dimethyldiethoxysilane is partially hydrolyzed before addition of methyltriethoxysilane monomer, coupling of a methylsiloxy group with the silanol group of a dimethylsiloxy group is preferred over coupling with another methylsiloxy group. In the resultant structure, therefore, the cross-linking of methylsiloxy groups is reduced, and the dimethylsiloxane groups act as plasticizer segments between the cross-links. Phenyl pendant groups, when present, contribute to the overall flexibility of the molecule by reducing the cross-link network density without introducing excessive softness.

According to this embodiment, therefore, a coating composition is applied to an article, the composition containing a silsequioxane oligomer fabricated by mixing methyltriethoxysilane monomer with dimethyldiethoxysilane monomer that has already been partially hydrolyzed (referred to hereafter as a stepwise addition). It is possible to purchase preformed dimethylsiloxane short chains instead of performing a pre-hydrolysis of dimethyldiethoxysilane (short chains indicate linear polydimethylsiloxane chains having relatively low molecular weight, e.g., 360–450). If desired, phenyltriethoxysilane monomer is also mixed with the partially hydrolyzed dimethyldiethoxysilane monomer or the dimethylsiloxane short chains, and it is possible for this phenyltriethoxysilane monomer to be partially hydrolyzed as well. Advantageously, the article to be coated is an optical fiber.

It was further realized that the formation or inclusion of low molecular weight dimethylsiloxane chains in this embodiment, while useful in reducing the overall cross-link density, reduced the number of silanol groups available for reaction with the added triethoxysilane monomer. Thus, upon simultaneous addition of methyltriethoxysilane monomer and water to partially hydrolyzed dimethyldiethoxysilane (or dimethylsiloxy short chains), the probability of forming oligomer segments rich in methylsiloxy groups in fact increased. Such segments would constitute highly cross-linked, stiff regions prone to cracking. It was found that inclusion of a higher number of dimethyl groups reduced the potential for formation of such highly cross-linked regions. Specifically, a percentage of dimethyl groups (i.e., a B value) of about 50 to about 60 was found to be advantageous in providing desirable thermal stability, as reflected in Example 2 below. An oligomer having a B value higher than about 60 is typically difficult to make.

Advantageously, the silsequioxane oligomer, as described in terms of pendant group ratio A:B:C (methyl:dimethyl:phenyl), has an A value of about 13 to about 67, a B value of greater than 0 to about 60, and a C value of greater than 0 to about 33. More advantageously, A is about 10 to about 30, B is about 40 to about 60, and C is about 10 to about 30.

A useful viscosity range for the coating composition of this third embodiment is about 1000 to about 4000 cp. It is possible to provide the oligomer fabricated in the process of this third embodiment with a useful viscosity by selection of the fabrication conditions, e.g., the amount of water that is used in the partial condensation of the monomers, the temperature the condensation is taken to, and the temperature of the oligomer solution, such that the use of a viscosity-reducing additive is not always necessary. It is advantageous, however, to include the lower aliphatic ketone viscosity-lowering additive to allow use of a higher viscosity oligomer that resists beading. Advantageously, the viscosity-reducing additive is acetone, and is present in an amount ranging from about 1 to about 6 weight percent based on the weight of the siloxane oligomer. It is also useful to add a catalyst to promote the condensation reaction, particularly where the article is an optical fiber. The catalyst is advantageously zinc octoate (where no phenyl is resent) or PPA (which is useful in obtaining a desirable cure rate for phenyl-containing oligomers), and is advantageously present in an amount ranging from about 1 to about 6 weight percent based on the weight of the siloxane oligomer.

Once the oligomer is prepared in the above manner, the coating composition is prepared by any suitable method. One such method is to dilute the catalyst with a solvent, mix the catalyst and the oligomer, and remove the solvent. If the solvent is a material capable of acting as the viscosity-lowering additive, the desired amount of the additive is left in the composition.

The coating composition of this embodiment is applied to the article and cured by any suitable method, as discussed above.

Using the process of this third embodiment of the invention, it is possible to dispense a coating composition on an optical fiber using a draw cup at a speed of about 1 m/sec, and obtain a post-cure coating thickness of at least about 20 μm from a single draw. As shown in Example 2 below, a coating where the pendant group ratio of the oligomer is about 20:60:20 is able to withstand temperatures above 200° C. for about a month without cracking.

EXAMPLE 1

Procedure

Table I lists the silsequioxane oligomers evaluated, including the qualitative rate of cure for the non-catalyzed oligomer. All the oligomers were obtained from OI-NEG, Toledo, Ohio.

TABLE I

| Ratio of Pendant Groups (Methyl:Dimethyl:Phenyl) | Rate of Cure (uncatalyzed) |
|---|---|
| 100:0:0 | fast |
| 67:33:0 | moderate |
| 67:0:33 | moderate |
| 50:0:50 | moderate |
| 40:20:40 | moderate |
| 33:33:33 | moderate |
| 20:0:80 | slow |
| 13:13:75 | slow |
| 0:0:75:25 diphenyl | slow |
| 0:0:100 | slow |

The degree of cure of an oligomer after a thermal treatment was evaluated qualitatively by noting the hardness and/or tackiness of a film on a glass slide. During initial testing, a layer of oligomer (both alone and containing a catalyst) was spread on a glass slide with a 6 mil doctor blade. The slide was placed in a convection oven maintained at 140 or 160° C., or, for less active catalysts, about 180° C. The degree of cure was evaluated by the ease with which the coating could be scratched with a pencil. The results are presented in Table I.

Numerous catalysts were evaluated as to their effect on the cure rate of the oligomers. To decrease the probability of localized oligomer condensation during addition of the catalysts, the oligomers and catalyst were diluted in a solvent prior to mixing. Typically, for the all-methyl silsequioxane, a weighed amount of liquid, solventless oligomer (having a viscosity of about 2000 cp) was diluted to twice its volume with acetone. About 3–6% catalyst based on the weight of the oligomer was dissolved in approximately 20 times its volume of acetone and added to the resin solution. The acetone, which was used both as a solvent and as a viscosity-lowering additive, was then removed to the desired amount using a rotary evaporator equipped with a water bath maintained at 45° C. The second, higher viscosity oligomer was also diluted with acetone before being added to the composition. The same procedure was used with modified methylsilsequioxane oligomers (except that no second, higher viscosity oligomer was added).

Oligomers were applied to optical fiber in two ways. Initial evaluations were made using a conventionally coated fiber as a substrate on a bench-scale tower. After an initial screening on this apparatus, the faster-curing formulations were tested on a full-size 29-foot draw tower, air-cooled, with 50 grams of tension, modified by the addition of a heater composed of three 3-foot, wire wound, silica tubes placed directly below the coating cup.

The effect of increasing the silanol concentration in the uncured oligomer was evaluated by adding acidified water (having a pH of about 3 to about 5). The addition of water to the all-methyl oligomers result in a tacky coating with some oligomers, while causing a hard, bubbly coating on others, and was therefore discontinued.

Coating weight loss was monitored with a DuPont 9900 Thermal Analyzer equipped with a 951 Thermogravimetric (TGA) Module. A 5–10 mg sample of cured oligomer was heated at 10°/min from 60 to 550° C., while the chamber was swept with oxygen at a flow rate of 50 cc/min.

Results

100% methylsilsequioxane

An initial experiment was performed with an ethanol solution of a methylsilsequioxane oligomer having a viscosity of about 2000, 4–5% residual ethoxy groups, and 12–14% OH groups. The ethanol was removed and the oligomer coated onto a fiber and cured. A tack-free beaded coating was obtained at a tower draw speed of 0.4 m/sec. TGA experiments showed that the all-methyl oligomer began rapidly losing weight at 369° C.

To maintain at least six hours of latency at room temperature and to permit a reasonable working period, zinc octoate was found to be an acceptable catalyst with all-methyl oligomer.

The higher viscosity all-methyl oligomer, the catalyst, and the viscosity-lowering additive were found to be significant factors in increasing line speed. Specifically, a composition was prepared from two methylsilsequioxane oligomers with viscosities of 64,000 cp and 2,000 cp, present in a weight ratio of 69:11, respectively, containing 3 weight percent zinc octoate, and 3 weight percent acetone, based on the weight of the siloxane oligomer in the coating composition. The composition cured to form a tack-free, bead-free 20–30 μm coating at a line speed of 3.3 m/sec. Cracking was observed in the coatings after aging for one month at 150° C.

Modified Methylsilsequioxane

The 100% methylsilsequioxane was modified by replacing some of the pendant methyl groups with phenyl and/or incorporating dimethylsiloxane groups into the methylsilsequioxane backbone, in accordance with the pendant group ratios identified in Table I. The modified methylsilsequioxane was prepared by mixing the appropriate amounts of methyltriethoxysilane monomer with dimethyldiethoxysilane and/or phenyltriethoxysilane monomer, along with water, heating the reactants to drive the condensation, and distilling off the ethanol. The modified oligomers appeared to be random copolymers of the reactants.

TGA experiments showed that 33:33:33 and 13:13:75 oligomers had weight loss onsets of 428° C. and 490° C., respectively.

Oligomers having pendant phenyl and/or dimethyl groups were more difficult to cure than the all-methyl oligomer. A friable coating resulted when a 25 methyl:75 phenyl oligomer, with 8 weight percent PPA catalyst, based on the weight of the siloxane oligomer, was cured. A 3:1 mixture of a 33:33:33 oligomer and a 20:0:80 oligomer (having a combined pendant group ratio of 25:31:44), containing 8 weight percent PPA catalyst based on the weight of the siloxane oligomer, beaded upon cure at a relatively low draw speed of less than 0.25 m/sec. The addition of 5 weight percent phenylsilsequioxane solid flake resin to separate compositions containing solventless, pre-hydrolyzed 0:0:100 liquid oligomer and 13:13:75 oligomer, respectively, and 4 weight percent PPA, resulted in beaded coatings that could only be cured at relatively low draw speeds of less than 0.2 m/sec (the weight percent based on the weight of the oligomer).

In an attempt to determine ways to increase draw speeds and reduce beading, numerous catalysts were mixed with the 13:13:75 oligomer. The evaluated metal soaps fell into three categories—(1) those that reacted too fast with the pre-hydrolyzed oligomer and formed gel at room temperature; (2) those that accelerated the condensation such that a hard film formed after seconds at 140° C.; and (3) those that only yielded a partially cured film after the heat treatment. Group (1) consisted of Sn, Sb, and Bi soaps. Group (2) contained only zinc octoate and iron carboxylate. These two soaps were latent at room temperature and also cured the oligomer to a hard film at elevated temperatures, e.g., 140° C. The rest of the catalysts were group (3) and decreased in activity in the following order: Cu>Co>Ni>Mo>Cr>Zr≧Mn=V. The amount of zinc octoate used with the 13:13:75 oligomer was found to be limited to about 3 weight percent or less, based on the weight of the oligomer. Higher amounts resulted in an undesirably slow condensation and uncured coating on the bench-scale draw tower.

The effect of pendant groups on cure rate was evaluated by determining the line speeds at which a cured coating was attained on the draw tower. A line speed of about 1.25–1.5 m/sec was obtained for a composition containing 67:33:0 oligomer and 3 weight percent zinc octoate based on the weight of the oligomer. For 67:0:33 oligomer, with 3 weight percent PPA based on the weight of the oligomer, a line speed of about 2 m/sec produced a beaded coating. Adding 3 weight percent PPA based on the weight of the oligomer to all-methyl or 67:33:0 oligomer resulted in immediate condensation at room temperature.

With a composition containing 50:0:50 oligomer and 3% PPA (based on the weight of the oligomer), a line speed on the draw tower of about 2 m/sec was obtained. To obtain the same line speed with a 40:20:40 oligomer, 6 weight percent PPA based on the weight of the oligomer was required. The all-phenyl oligomer, when mixed with three parts 33:33:33 oligomer and 8 weight percent PPA based on the weight of the oligomer, required a draw speed of about 0.2 m/sec to obtain a cured coating on the draw tower. Using 6 weight percent PPA based on the weight of the oligomer with 33:33:33 oligomer decreased the attainable line speed to about 1 m/sec, at which a 20 coating could be applied. However, an off-line heating was required to complete the cure. The coating produced from the 33:33:33 oligomer had a thermal stability of about 175° C.

EXAMPLE 2

The silsequioxane oligomers in Table II were evaluated for their use in a coating. The oligomers were obtained from OI-NEG, Toledo, Ohio, and were prepared by OI-NEG under conditions sufficient to provide an oligomer viscosity ranging from about 1000 to about 2000 cp. A PPA catalyst was used. Table II indicates the method by which the oligomers were prepared, the aging performed on the coatings, and the results of the aging tests. Where a fourth value is present in the pendant group ratio (both in Table II and in the text below), the fourth value indicates the mole ratio of dimethylsiloxy short chains included when forming the oligomer.

The 86:0:0:14 and 75:0:0:25 oligomers were made from simultaneous hydrolysis of the methytriethoxysilane and low molecular weight (360–450) linear polydimethylsiloxane chains, referred to above as short chains. The 25:50:25:0 oligomer was made by addition of methyltriethoxysilane monomer and phenyltriethoxysilane monomer to partially hydrolyzed and oligomerized dimethyldiethoxysilane monomer. The 20:60:20:0 oligomer was made by addition of methyltriethoxysilane monomer to partially hydrolyzed and oligomerized dimethyldiethoxysilane monomer and partially hydrolyzed and oligomerized phenyltriethoxysilane monomer. A 33:33:33:0 oligomer made by simultaneously adding methyltriethoxysilane and phenyltriethoxysilane to partially hydrolyzed dimethyldiethoxysilane exhibited a faster condensation rate (at 80° C. and 4.5 weight percent PPA based on the weight of the oligomer) than the 33:33:33:0 oligomer made by adding methyltriethoxysilane to partially hydrolyzed phenyltriethoxysilane and partially hydrolyzed dimethyldiethoxysilane. Only the faster-curing 33:33:33:0 oligomer was coated onto optical fiber.

TABLE II

| Ratio of Pendant Groups (Methyl:Dimethyl: Phenyl:Dimethyl Short Chains) | Method of Oligomer Preparation | Aging | Crack Density and Type After Aging |
|---|---|---|---|
| 33:33:33:0 | simultaneous hydrolysis | 50 days @ 210° C. | moderate crack density; circumferential |
| 33:33:33:0 | stepwise addition (in situ dimethyl block formation) | 50 days @ 210° C. | low crack density; circumferential |
| 86:0:0:14 | simultaneous hydrolysis | 5½ weeks @ 200° C. | high crack density; spiral |
| 75:0:0:25 | simultaneous hydrolysis | 5½ weeks @ 200° C. | some crack free regions, moderate crack density; circumferential and spiral cracks |
| 33:25:33:8 | simultaneous hydrolysis | 5½ weeks @ 200° C. | some crack free regions, lower crack density than 33:33:33 stepwise; circumferential |
| 33:17:33:17 | simultaneous hydrolysis | 5½ weeks @ 200° C. | small crack free regions, higher crack density than 33:25:33:8; circumferential and spiral cracks |
| 25:50:25:0 | stepwise addition | 50 days @ 210° C. | low crack density; circumferential, |
| 20:60:20:0 | stepwise addition | 28 days @ 210° C. | no cracks |

Procedure

To form the coating compositions, 50 g of oligomer(s) was transferred to a 200 mL round bottom flask, and 2.25 g (4.5 percent based on the weight of the oligomer) of PPA dissolved in 10 mL of acetone was added to the flask. The flask was swirled until only one phase was visible, and then the flask was placed on a rotary evaporator equipped with a water bath maintained at 45° C. The removal of acetone was continued until about 3 percent based on the weight of the oligomer remained in the composition. The inclusion of this amount of acetone resulted in an approximately 50% reduction in oligomer viscosity. Coating compositions with viscosities greater than about 3000 cp were too viscous to be used with a pressurized draw cup on the draw tower.

A 20 μm thick coating of the coating compositions was applied to bare silica fiber on the same draw tower as in Example 1, that had been modified by the addition of three 3-foot long, wire wound, silica heater tubes placed below the coating cup. A line speed of 1 m/sec was used. Loose coils of the coated fiber, about 8 inches in diameter, were subsequently hung overnight in a 140° C. forced air oven.

Coating weight loss was monitored with a DuPont 9900 Thermal Analyzer equipped with a 951 or 2950 Thermogravimetric (TGA) Module. A 5–10 mg sample of oligomer that had been cured overnight in a 140° C. oven on an aluminum sheet was heated at 10°/min from 60 to 550° C., while the chamber was swept with oxygen at a flow rate of 50 cc/min.

Aged fibers were examined with a light microscope having a 400× objective. Strength of coated fibers was determined using a two point bend test. The bend test was performed by mounting approximately 1 mm lengths of fiber between two parallel face plates that were brought together by a computer-controlled, stepper motor at a rate of 1000 μm/sec. Measurements were made at room temperature (about 25° C.).

Results

TGA scans of the 75:0:0:25 and 86:0:0:14 coating compositions showed less than 2 weight percent loss on heating to 350° C. in oxygen. (The rate of condensation of an 80:0:0:20 oligomer at 80° C. indicated that a slow line speed would be required, and it was therefore not studied further.) After aging at 200° C. for 5½ weeks, the coating formed from the 86:0:0:14 oligomer had a long spiral crack extending over the length of the fiber. After the same aging, the 75:0:0:25 coating had an irregular cracking pattern—areas with circumferential cracks, areas with spiral cracks, and areas free of cracks—that suggested an uneven distribution of methylsiloxy groups.

The 33:25:33:8 and 33:17:33:17 coating compositions both exhibited cracks after aging at 200° C. for 5½ weeks, with the former having fewer cracks than the latter. Aging of a fiber coated with the faster-curing 33:33:33 oligomer at 210° C. for 50 days resulted in many regularly-spaced circumferential cracks.

The coating resulting from the 25:50:25:0 oligomer exhibited improved properties. After aging at 210° C. for 50 days, 3–4 inch sections of the fiber were free of cracks, and only a few irregularly spaced circumferential cracks were visible through the microscope.

The 20:60:20:0 oligomer resulted in a coating exhibiting even better properties. Examination of five 10-inch fibers aged at 210° C. for 28 days showed no cracks. TGA analysis of the cured oligomer showed a weight loss of 4.25% on heating to at 350° C. Strength measurements were carried out on the aged fibers and on unaged fibers coated with the 20:60:20:0 oligomer. The median failure strain was 7.77% for unaged fibers and 7.92% for aged fibers. For both samples, a unimodal distribution and near overlay of probability of failure at a given strain was observed. The strength distributions for both samples were the same, within the approximately 2% experimental error, indicating the absence of cracks in the aged fibers.

Other embodiments of the invention will be apparent to those skilled in the art from consideration of the specification and practice of the invention disclosed herein.

What is claimed is:

1. A method for coating an article, comprising the steps of:
    disposing a coating composition on an article, wherein the coating composition comprises a first methylsilsequioxane oligomer having an initial viscosity of about 2000 cp or less, a second methylsilsequioxane oligomer having an initial viscosity of about 40,000 to about 90,000 cp, a viscosity-lowering additive of a lower aliphatic ketone, and a catalyst; and
    curing the coating.

2. The method of claim 1, wherein the viscosity-lowering additive is acetone.

3. The method of claim 1, wherein the catalyst is zinc octoate.

4. The method of claim 1, wherein the first oligomer is present in an amount ranging from about 10 to about 20 weight percent and the second oligomer is present in an amount ranging from about 80 to about 90 weight percent, based on the weight of the total siloxane oligomer in the coating composition.

5. The method of claim 1, wherein the viscosity-lowering additive is present in an amount of about 1 to about 6 weight percent, based on the weight of the total siloxane oligomer in the coating composition.

6. The method of claim 1, wherein the catalyst is present in an amount ranging from about 0.5 to about 6 weight percent, based on the weight of the total siloxane oligomer in the coating composition.

7. The method of claim 1, wherein the article is an optical fiber.

8. The method of claim 7, wherein the coating composition is disposed on the fiber by drawing the fiber through a container that comprises the coating composition.

9. The method of claim 8, wherein the thickness of the cured coating after a single pass through the container is at least about 20 μm.

10. The method of claim 9, wherein the fiber is drawn through the container at a speed of at least about 1 m/sec.

11. The method of claim 10, wherein the speed is at least about 3 m/sec.

12. A method for coating an article, comprising the steps of:
    disposing a coating composition on an article, wherein the coating composition comprises a silsequioxane oligomer having methyl, dimethyl, and phenyl pendant groups, a viscosity-lowering additive of a lower aliphatic ketone, and a catalyst of a moderately strong protic acid; and
    curing the coating.

13. The method of claim 12, wherein the silsequioxane oligomer has a pendant group ratio of A:B:C, where A represents methyl pendant groups and ranges from about 13 to about 67, B represents dimethyl pendant groups and ranges from greater than 0 to about 33, and C represents phenyl pendant groups and ranges from about 10 to about 80.

14. The method of claim 12, wherein the viscosity-lowering additive is acetone.

15. The method of claim 12, wherein the catalyst is phenylphosphonic acid.

16. The method of claim 12, wherein the oligomer is present in an amount ranging from about 88 to about 98 weight percent, based on the weight of the coating composition.

17. The method of claim 12, wherein the viscosity-lowering additive is present in an amount of about 1 to about 6 weight percent, based on the weight of the siloxane oligomer.

18. The method of claim 12, wherein the catalyst is present in an amount ranging from about 0.5 to about 6 weight percent, based on the weight of the siloxane oligomer.

19. The method of claim 12, wherein the article is an optical fiber.

20. The method of claim 19, wherein the coating composition is disposed on the fiber by drawing the fiber through a container that comprises the coating composition.

21. The method of claim 20, wherein the thickness of the cured coating after a single pass through the container is at least about 20 μm.

22. The method of claim 21, wherein the fiber is drawn through the container at a speed of at least about 1 m/sec.

23. The method of claim 22, wherein the speed is at least about 2 m/sec.

24. A method for coating an article, comprising the steps of:
    disposing a coating composition on an article, wherein the coating composition comprises a silsequioxane oligomer fabricated by a process comprising the step of mixing methyltriethoxysilane monomer, and optionally phenyltriethoxysilane monomer, with partially hydrolyzed dimethyldiethoxysilane monomer or dimethylsiloxane short chains; and
    curing the coating.

25. The method of claim 24, wherein the phenyltriethoxysilane monomer is partially hydrolyzed.

26. The method of claim 24, wherein the silsequioxane oligomer has a pendant group ratio of A:B:C, where A represents methyl pendant groups and ranges from about 13 to about 67, B represents dimethyl pendant groups and ranges from greater than 0 to about 60, and C represents phenyl pendant groups and ranges from greater than 0 to about 33.

27. The method of claim 26, wherein A is about 10 to about 30, B is about 40 to about 60, and C is about 10 to about 30.

28. The method of claim 24, wherein the coating composition further comprises a viscosity-lowering additive of a lower aliphatic ketone.

29. The method of claim 28, wherein the viscosity-lowering additive is acetone.

30. The method of claim 24, wherein the coating composition further comprises a catalyst.

31. The method of claim 30, wherein the catalyst is selected from the group consisting of zinc octoate and phenylphosphonic acid.

32. The method of claim 28, wherein the viscosity-lowering additive is present in an amount of about 1 to about 6 weight percent based on the weight of the siloxane oligomer.

33. The method of claim 30, wherein the catalyst is present in an amount of about 1 to about 6 weight percent based on the weight of the siloxane oligomer.

34. The method of claim 24, wherein the article is an optical fiber.

35. The method of claim 34, wherein the coating composition is disposed on the fiber by drawing the fiber through a container that comprises the coating composition.

36. The method of claim 35, wherein the thickness of the cured coating after a single pass through the container is at least about 20 μm.

37. The method of claim 36, wherein the fiber is drawn through the container at a speed of at least about 1 m/sec.

38. The method of claim 37, wherein the cured coating has a thermal mechanical stability of about 210° C.

39. An article comprising an adherent coating, wherein the coating comprises a cured silsequioxane oligomer, the oligomer fabricated by a process comprising the steps of mixing methyltriethoxysilane monomer, and optionally phenyltriethoxysilane monomer, with partially hydrolyzed dimethyldiethoxysilane monomer or dimethylsiloxy short chains.

40. The article of claim 39, wherein the phenyltriethoxysilane monomer is partially hydrolyzed.

41. The article of claim 39, wherein the silsequioxane oligomer has a pendant group ratio of A:B:C, where A represents methyl pendant groups and ranges from about 13 to about 67, B represents dimethyl pendant groups and ranges from greater than 0 to about 60, and C represents phenyl pendant groups and ranges from greater than 0 to about 33.

42. The article of claim 41, wherein A ranges from about 10 to about 30, B ranges from about 40 to about 60, and C ranges from about 10 to about 30.

43. The article of claim 42, wherein the coating has a thermal mechanical stability of about 210° C.

44. The article of claim 39, wherein the article is an optical fiber.

45. The article of claim 44, wherein the coating is at least about 20 $\mu$m thick.

* * * * *